June 26, 1973   J. S. TORREY   3,741,786
TRANSFER TAPE HAVING NON-CONTIGUOUS PRESSURE
SENSITIVE ADHESIVE PATTERNS
Filed May 28, 1971
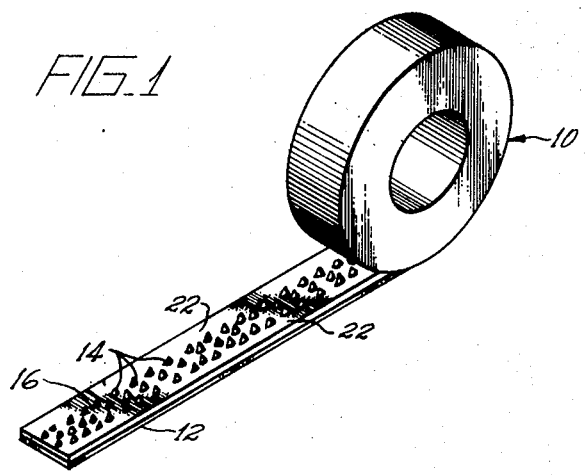
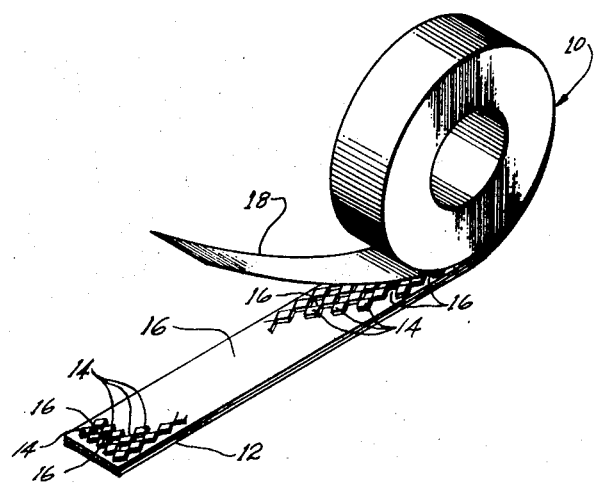
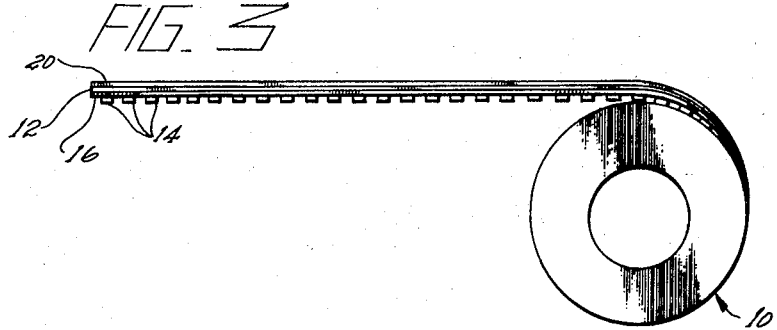
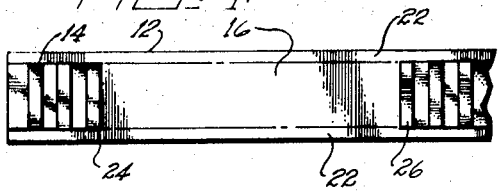
INVENTOR
JOHN S. TORREY
BY Christie, Parker + Hale
ATTORNEYS United States Patent Office 3,741,786
Patented June 26, 1973

3,741,786
TRANSFER TAPE HAVING NON-CONTIGUOUS PRESSURE SENSITIVE ADHESIVE PATTERNS
John S. Torrey, Arcadia, Calif., assignor to Avery Products Corporation, San Marino, Calif.
Filed May 28, 1971, Ser. No. 147,881
Int. Cl. B32b 7/14; B41m 3/12
U.S. Cl. 117—3.1                                                    12 Claims

ABSTRACT OF THE DISCLOSURE

There is provided a pressure sensitive adhesive transfer tape consisting of a release coated carrier tape bearing a plurality of substantially non-contiguous pressure sensitive adhesive segments. This construction allows the pressure sensitive adhesive segments to be transferred from the relase coated carrier tape to a substrate without cutting the carrier tape and/or the adhesive.

BACKGROUND OF THE INVENTION

Pressure sensitive adhesives are well known in the art as adhesives which can be applied to a substrate by the mere application of pressure without the necessity of activating the adhesive by a solvent or heat.

A variety of tape constructions have been proposed for applying a pressure sensitive adhesive from a release coated carrier tape to a substrate. One characteristic common to these constructions is that at least a part of the width of the carrier tape is uniformly coated with an adhesive on one or both of its surfaces. One modification is described in U.S. Pat. 2,515,423 to Ptasnik. According to U.S. Pat. 2,515,423, after the tape is uniformly coated with a pressure sensitive adhesive a nonadhesive pellicular material is placed on the adhesive layer in some patterned configuration to reduce the adhesivity of at least a portion of the adhesive layer and to facilitate unrolling of the tape without tearing at the lateral edges of the tape.

The prior art constructions including that described in U.S. Pat. 2,515,423 have several inherent disadvantages. After application, the adhesive tends to string or stretch unless it is cut prior to separating the applied adhesive from that remaining on the carrier tape. In the alternative, the adhesive, and at times the carrier tape must be cut at the time the adhesive is applied to the substrate, the cut portion of the tape being then removed from the applied adhesive.

Tape guiding and drive mechanisms in dispensers used with such tapes have also presented operating difficulties as a consequence of surfaces contacting adhesive. In addition, even when the carrier for the adhesive is wound for disposal after adhesive transfer, difficulties are encountered if any residual adhesive remains on the surface of the tape following adhesive application.

SUMMARY OF THE INVENTION

It has now been found that the problems attendant to prior art adhesive transfer tape constructions may be overcome by a transfer tape construction in which there is applied to the release surface on a carrier tape a plurality of substantially non-contiguous, raised, pressure sensitive segments. In this construction, any amount of the pressure sensitive adhesive carried by the transfer tape can be transferred to a substrate by the application of pressure without cutting of the transfer tape or the carried pressure sensitive adhesive.

In particular, the pressure sensitive adhesive transfer tape construction of this invention comprises a carrier tape which has at least release zones or a release coating on at least one of its surfaces, a plurality of substantially non-contiguous raised pressure sensitive adhesive segments along the length of the transfer tape, and in adhesive contact with the release zones or coating, the segments being transferrable to a substrate by the application of pressure to the transfer tape sufficient to form a bond of the pressure sensitive segments to the substrate which exceeds the bond to the release zones or coating on the carrier tape.

In a preferred construction, the carrier tape is release coated on both of its surfaces in order that the tape can be wound into a roll with the backsize serving to release the raised pressure sensitive adhesive segments brought into contact with the backsize. In this construction, the backsize has a lower adhesivity for the pressure sensitive adhesive segments that the adhesivity of the pressure sensitive adhesive segments for the principal release coating on the carrier tape.

Alternately, there may be provided a second release coated tape which is in contact with the pressure sensitive adhesive segments, the adhesion to the segments being less than the adhesion of the segments to the carrier tape and which serves to protect the adhesive while the tape is wound and until it is transferred to a substrate.

In another embodiment of the invention, the width of the pattern of applied pressure sensitive segments is not coextensive with the width of the tape to provide borders on one or both edges of the carrier tape. These borders serve as guides during dispensing of the pressure sensitive adhesive transfer tape from some dispensing means. In such an operation, the guiding surfaces of the dispensing means are not brought in contact with that portion of the tape coated with the raised pressure sensitive segments.

Because the raised pressure sensitive segments on the tape forms some pattern which is substantially non-contiguous in nature, rupturing or cutting of the adhesive is not necessary when the adhesive is transferred to a substrate eliminating thereby the problems inherent in prior art transfer tape systems.

DRAWINGS

FIG. 1 is an illustration of a transfer tape construction of this invention in which the width of the applied substantially non-contiguous raised pressure sensitive segments, illustrated as raised dots, are not coextensive with the width of the carrier tape to provide borders at the edges of the tape.

FIG. 2 illustrates an alternate transfer tape construction in which the width of the applied substantially non-contiguous raised pressure sensitive segments is coextensive with the width of the carrier tape, that the segment can be in contact with each other to some limited degree and the alternate embodiment of providing a release coated tape to protect the pressure sensitive adhesive segments prior to application.

FIG. 3 is a side view of the transfer tape construction of this invention illustrating non-contiguous bars of pressure sensitive adhesive as another alternative to the patterns illustrated in FIGS. 1 and 2, and a backsize for contact with pressure sensitive adhesive segments on the opposite side of the carrier tape.

FIG. 4 is an illustration of the undersurface of the transfer tape and the non-contiguous pressure sensitive adhesive segments illustrated in FIG. 3 with a portion of the bars removed to demonstrate pressure sensitive adhesive transfer from the carrier tape.

DESCRIPTION

According to the present invention there is provided a pressure sensitive adhesive transfer tape construction for transferring pressure sensitive adhesives to a substrate without disruption of the adhesive or cutting of the carrier tape or the adhesive.

The novel transfer tape construction of this invention comprises a carrier tape which has release surface at least in the area in contact with a plurality of substantially non-contiguous pressure sensitive adhesive segments carried along the length of the carrier tape. Where the transfer tape is to be wound into a roll, the carrier tape may be release coated on both surfaces, to provide the principal release coating and backsize wherein the latter has a lower adhesion for the applied pressure sensitive adhesive segments than the adhesion of the pressure sensitive adhesive segments for the principal release coating on the carrier tape. Alternatively there may be applied over the pressure sensitive segments a release liner which serves to protect the pressure sensitive adhesive when the transfer tape is unwound and before the pressure sensitive adhesive is transferred to a substrate. In this latter construction the adhesion of the pressure sensitive adhesive segments for the released liner tape is less than the adhesion of the pressure sensitive adhesive segments for the release coating on the carrier tape.

In a preferred construction, the width of the pattern of substantially non-contiguous pressure sensitive adhesive segments is not coextensive with the width of the carrier tape to provide at one or both edges of the tape, borders which aid in guiding the tape when dispensed from some dispensing means.

As used herein, the term "a plurality of substantially non-contiguous raised pressure sensitive segments" is meant segments, the raised portions of which are separated from other pressure sensitive adhesive segments by some selected or random distance as well as pressure sensitive segments which are partially attached to or which abut adjacent pressure sensitive segments but wherein the cohesive bond at the zone of attachment or abutment is less than the adhesive bond of the pressure sensitive segments for the release coating on the carrier tape such that the pressure sensitive segments can be transferred from the carrier tape without stretching or stringing of the pressure sensitive adhesive. Also included within the meaning of the term is the possibility of an adhesive residue existing between two or more raised pressure sensitive adhesive segments as a consequence of the method employed in construcitng the pressure sensitive adhesive transfer tape of this invention. Again, the cohesive strength of the residue is less than the adhesive bond of the pressure sensitive adhesive segments for the release surface on the carrier tape such that transfer of pressure sensitive adhesive segments from the carrier tape to a substrate may be accomplished without stretching or stringing of the raised pressure sensitive adhesive segments.

As used herein the term "backsize" means a release coating applied to the reverse side of the carrier tape and having a lower adhesivity for the pressure sensitive adhesive than the adhesivity of the pressure sensitive adhesive for the release surface on the opposed side of the carrier tape.

The precise configuration of the raised segments employed in the transfer tape construction of this invention is not narrowly critical so long as there is provided an interrupted pressure sensitive adhesive surface separable from the carrier tape by the application of pressure without the necessity of adhesive rupture or cutting. The segments may, for instance, be in the form of the dots, diamonds or bars shown in the attached drawing, or have the shape of a star, a triangle or the like, and may be of mixed configuration. The pattern of applied pressure sensitive adhesive segments is also not narrowly critical and may be regular, irregular, mixed or the like.

The spacing between segments is also not narrowly critical and is mainly a function of the adhesive coverage desired per unit area of a substrate. This will, of course, be dependent, in part, on the adhesivity of the pressure sensitive adhesive selected, the affinity of the substrates for the pressure sensitive adhesive and the degree of bonding desired.

The pressure sensitive adhesive segments should not, however, be spaced so closely that prior to application to a substrate they will be compressed and thereby caused to form a uniform adhesive layer which no longer has definable zone of separation due to compressive forces resulting from manufacturing and/or handling. This would preclude removing the carrier tape from the applied pressure sensitive adhesive without tearing, rupturing, stretching, stringing or cutting the transferred pressure sensitive adhesive.

With these general parameters, reference is now made to FIGS. 1, 2, 3 and 4 for a more complete description for the novel transfer tape for dispensing pressure sensitives adhesives in accordance with the practice of this invention.

With reference, first, to FIG. 1, the transfer tape construction for dispensing raised pressure sensitive adhesive segments is generally provided as a roll 10 which supplies carrier tape 12 having on the one side thereof a plurality of substantially non-contiguous raised pressure sensitive segments 14 shown here as having the form of a dot or cone. Beneath each pressure sensitive adhesive segment or over at least that portion of the carrier tape bearing the pressure sensitive adhesive segments there is provided release coating 16. The release coatings employed are conventional and normally silicone based.

A characteristic of the release coating 16 is such that the adhesivity of the pressure sensitive adhesive segments 14 for release coating 16 is less than the adhesivity of the pressure sensitive adhesive segments 14 for the substrate to which the adhesive is to be applied such that upon application of the pressure sensitive segments to the substrate, a bond is formed to the substrate which exceeds the bond on the pressure sensitive segments to release coating 16 to permit complete transfer of the pressure sensitive adhesive to the substrate.

The nature of the carrier tape 12 may be varied widely and may, for instance, be paper, cellulose acetate, a polyolefin, a polyester or the like.

Since the transfer tape construction will normally be supplied in a roll, some means must be provided to assure that the pressure sensitive adhesive segments applied to the carrier tape will remain on the desired under surface of the carrier tape as opposed to being retained by the roll as the tape is unwound. This may be accomplished in several ways.

In order to accomplish the effect desired, there may be employed as a carrier tape 12, a polyolefin (or similar material adapted to be corona treated) which is corona treated on one surface. The treated surface, by virtue of achieving a degree of polarity higher than the non-treated surface, would function as the principal release surface 16 and the non-treated surface would function as the backsize 20. Alternatively, it may be elected to coat the corona treated surface with a release coating which serves as the backsize 20 when the pressure sensitive adhesive segments are applied to the non-treated surface.

With reference to FIG. 2, another method of achieving this result is to employ a release liner tape 18 having a release coating on the surface facing the pressure sensitive segments and having a bond strength to the pressure sensitive segments which is less than the bond strength of the segments for the coating 16 on carrier tape 12. The release liner tape may normally unroll with the tape and may be simultaneously separated from the pressure sensitive adhesive segments as the carrier tape is unrolled. In the alternative, the release liner tape may be allowed to remain with the transfer tape until the pressure sensitive segments 14 are to be applied to a substrate in order to protect the segments until the time of application.

Also with reference to FIG. 2, there is shown the substantially non-contiguous raised pressure sensitive segments in the shape of diamonds which contact at the points of the diamond pattern. The cohesive bond at the point of contact, as preivously indicated, is less than the adhesion of the segments for release coating 16 on carrier tape 12. In this illustration, a portion of the diamond shaped segments have not been illustrated for convenience, but it is understood the pattern may be uniform throughout the length of the transfer tape construction.

With reference to FIG. 3, yet another method of assuring that the pressure sensitive adhesive segments will remain on the under surface of the carrier tape there may be applied to the opposed or upper surface of the carrier tape a backsize 20 whose bond strength to the pressure sensitive adhesive segments 14 is less than the bond strength of the pressure sensitive adhesive segments 14 for the release coating 16 on carrier tape 12.

With reference again to FIG. 1, as well as FIG. 4, when the pressure sensitive adhesive transfer tape of this inven- is to be used in automatic or manual dispensing apparatus there is preferably provided a border 22 along one or both edges of the carrier tape. This is accomplished by co-limiting the width of the applied substantially non-contiguous pressure sensitive segments with respect to the width of the transfer tape to provide a border along one or both edges of the carrier tape. This facilitates guiding the tape via a simple dispensing means which eliminates contact of the pressure sensitive adhesive with said guide means on a dispenser. These guide means are dimensioned so as not to extend beyond borders 22 and into the substantially non-contiguous pressure sensitive adhesive segments.

With reference to FIG. 2, where the pattern or array of substantially non-contiguous raised pressure sensitive adhesive segments is coextensive with the width of the tape and there may be provided a secondary release liner tape 18 for contact with and protecting the pressure sensitive segments 14. In this construction any simple guide means on a dispenser may be employed.

With reference to FIG. 2 and FIG. 3, where pattern or array of substantially non-contiguous raised pressure sensitive adhesive segments is coextensive with the width of the carrier tape there may be provided a backsize 20 on the carrier tape which serves as a release surface for the raised pressure sensitive adhesive segments. Again the bond of the pressure sensitive adhesive segments for the backsize 20 is less than its bond to release surface 16.

The pressure sensitive adhesive transfer tape construction of this invention with its characteristic substantially non-contiguous raised pressure sensitive adhesive segments may be fabricated using any conventional pressure sensitive adhesives having an affinity for the substrate(s) to which the adhesive is to be applied or secured. In general, the pressure sensitive adhesives comprise some base polymer or combination of polymers, tackifiers, plasticizers and, where desired, stabilizers such as anti-oxidants.

Illustrative, but no wise limiting of the base polymers which may be used in formulating pressure sensitive adhesives there may be mentioned polyisobutylene, styrene butadiene copolymers, ethylene-vinyl acetate copolymers and the like.

Illustrative of tackifiers which are selected for their compatibility with the desired base polymer, there may be mentioned terpene resins, rosins, rosin esters, indene resins, alkyl substituted aromatic resins and the like.

As an anti-oxidant for stabilizing there may be mentioned butylated hydroxy toluene and the like.

As one specific example of a pressure sensitive adhesive formulation there may be mentioned a formulation comprising 40 parts by weight of an ethylene vinyl acetate copolymer, 60 parts by weight of a rosin ester as a tackifier, and 0.05 part by weight of a butylated hydroxy toluene as a stabilizer.

Pressure sensitive adhesive segments may be applied to the carrier tape itself or to a web from which the transfer tapes will be cut by any conventional means such as rotogravure printing, silk-screen printing, intermittent extrusion of an adhesive melt and the like as well as direct coating of an adhesive layer with subsequent cutting and stripping of an adhesive matrix from the transfer tape or web to provide the substantially non-contiguous raised pressure sensitive segments. For most applications, the adhesive will be applied to thickness of from about 0.3 mil or less to about 20 mils or more which is the degree of rise of the segments.

In employing these various application techniques, the adhesive may be applied to the carrier tape or web as a melt, an emulsion, a polymerizable liquid, a heat fusible powder, or in a solvent solution, the latter forming the pressure sensitive adhesive upon evaporation of the solvent.

While the pressure sensitive adhesive transfer tapes of this invention may be manufactured on an individual basis, they are more conveniently manufactured as a wide roll from which individual tapes are cut using conventional slitting apparatus.

Where the pressure sensitive adhesive segments are coextensive with the width of the transfer tape, transfer tapes of any desired width may be cut from the roll. Where, however, the wide roll is constructed to provide borders on one or both edges of the transfer tape cut therefrom, the positions of the slitting blades will be controlled to slit between or along bands of applied substantially non-contiguous pressure sensitive adhesive segments.

Although the constructions for the pressure sensitive adhesive transfer tapes of this invention may be varied widely an inherent characteristic is that the pressure sensitive segments carried by the transfer tape are substantially non-contiguous in nature. This offers several advantages.

First of all, with reference to FIG. 4, any portion of the adhesive can be transferred, such as the portion between segments 24 and 26, from the carrier tape to a substrate without cutting the carrier tape or the adhesive. The applied adhesive will be uniform in nature, not stretched, stringed or distorted.

In addition, the adhesive may be selected for easy removal from the substrate after application such as, for instance, by selecting an adhesive having a characteristic which enables it to be balled up and removed. In this instance, the adhesive while fulfilling the function of double faced tapes will not require the cumbersome methods of tape application and difficulty of removal of double faced tapes from a substrate.

An even more significant advantage of the substantially non-contiguous nature of the applied pressure sensitive adhesive segments is that they function as discrete adhesive segments and therefore any change in dimension due to humidity, temperature or the like remain localized and are not propagated throughout a continuous mass of adhesive. This prevents shrinking and curling of substrates bonded by the pressure sensitive segments, as for instance, where it is employed to bind thin sheets of paper. Expansion, shrinking and curling on a substrate, on the other hand, can be experienced where adhesive is applied as a continuous layer.

Still another significant advantage of the substantially non-contiguous pressure sensitive segments over double faced pressure sensitive adhesive tapes is the elimination of the film between the adhesive layers in the latter. This film may well show a different degree of the aforementioned changes in dimension as compared to the substrate to which the double faced tape construction is applied and may also transmit stress through a continuous film of adhesive to the substrate to which the double faced tape is applied.

Many of the terms used herein are those accepted by the Pressure Sensitive Tape Council, as published in "Test Methods for Pressure Sensitive Tapes," fifth edition, October, 1963, and developed by the Specifications and Technical Committee of the Pressure Sensitive Tape Council, which is incorporated herein by reference.

What is claimed is:

1. A pressure sensitive adhesive transfer tape construction comprising:
   (a) a carrier tape material having a release surface on at least a portion of one side thereof;
   (b) a plurality of substantially non-contiguous raised pressure sensitive adhesive segments disposed along the length of said carrier tape in adhesive contact with said release surface, the adhesion of said segments for said release surface being less than the adhesivity of said pressure sensitive adhesive segments for a substrate to which the pressure sensitive adhesive segments are to be transferred.

2. A pressure sensitive adhesive transfer tape construction as claimed in claim 1 in which the release surface and plurality of substantially non-contiguous raised pressure sensitive adhesive segments disposed along the length of the carrier tape material are coextensive with the width of the carrier tape material.

3. A pressure sensitive adhesive transfer tape construction as claimed in claim 1 in which at least the width of the plurality of substantially non-contiguous raised pressure sensitive adhesive segments disposed along the length of the carrier tape material is less than the width of the carrier tape material to provide a border along at least one edge of the carrier tape material.

4. A pressure sensitive adhesive transfer tape construction as claimed in claim 1 in which at least the width of the plurality of the substantially non-contiguous raised pressure sensitive adhesive segments disposed along the length of the carrier tape material is less than the width of the carrier tape material to provide a border along both edges of the carrier tape material.

5. A pressure sensitive adhesive transfer tape construction as claimed in claim 1 in which the carrier tape material has a backsize on at least a portion of the opposed side of said carrier tape material, said backsize adapted to contact the substantially non-contiguous raised pressure sensitive adhesive segments when the transfer tape is formed into a roll, the bond of the raised pressure sensitive adhesive segments to the backsize being less than the bond of the pressure sensitive adhesive segments to the release surface on the carrier tape.

6. A pressure sensitive adhesive transfer tape construction as claimed in claim 2 in which the carrier tape material has a backsize on at least a portion of the opposed side of said carrier tape material, said backsize adapted to contact the substantially non-contiguous raised pressure sensitive adhesive segments when the transfer tape is formed into a roll, the bond of the raised pressure sensitive adhesive segments to the backsize being less than the bond of the pressure sensitive adhesive segments to the release surface on the carrier tape.

7. A pressure sensitive adhesive transfer tape construction as claimed in claim 3 in which the carrier tape material has a backsize on at least a portion of the opposed side of said carrier tape material, said backsize adapted to contact the substantially non-contiguous raised pressure sensitive adhesive segments when the transfer tape is formed into a roll, the bond of the raised pressure sensitive adhesive segments to the backsize being less than the bond of the pressure sensitive adhesive segments to the release surface on the carrier tape.

8. A pressure sensitive adhesive transfer tape construction as claimed in claim 4 in which the carrier tape material has a backsize on at least a portion of the opposed side of said carrier tape material, said backsize adapted to contact the substantially non-contiguous raised pressure sensitive adhesive segments when the transfer tape is formed into a roll, the bond of the raised pressure sensitive adhesive segments to the backsize being less than the bond of the pressure sensitive adhesive segments to the release surface on the carrier tape.

9. A pressure sensitive adhesive transfer tape construction as claimed in claim 1 in which the plurality of substantially non-contiguous raised pressure sensitive adhesive segments are in contact with a separate release liner, the adhesion of the raised pressure sensitive adhesive segments to said release liner being less than the adhesion of the raised pressure sensitive adhesive segments for the release surface on the carrier tape material.

10. A pressure sensitive adhesive transfer tape construction as claimed in claim 2 in which the plurality of substantially non-contiguous raised pressure sensitive adhesive segments are in contact with a separate release liner, the adhesion of the raised pressure sensitive adhesive segments to said release liner being less than the adhesion of the raised pressure sensitive adhesive segments for the release surface on the carrier tape material.

10. A pressure sensitive adhesive transfer tape construction as claimed in claim 3 in which the plurality of substantially non-contiguous raised pressure sensitive adhesive segments are in contact with a separate release liner, the adhesion of the raised pressure sensitive adhesive segments to said release liner being less than the adhesion of the raised pressure sensitive adhesive segments for the release surface on the carrier tape material.

12. A pressure sensitive adhesive transfer tape construction as claimed in claim 4 in which the plurality of substantially non-contiguous raised pressure sensitive adhesive segments are in contact with a separate release liner, the adhesion of the raised pressure sensitive adhesive segments to said release liner being less than the adhesion of the raised pressure sensitive adhesive segments for the release surface on the carrier tape material.

References Cited
UNITED STATES PATENTS

| | | | |
|---|---|---|---|
| 2,191,704 | 2/1940 | Bennett | 117—3.1 |
| 1,882,593 | 10/1932 | Hentschel | 117—3.4 |
| 2,515,423 | 7/1950 | Ptasnik | 117—122 X |
| 2,822,290 | 2/1958 | Webber | 117—122 X |
| 2,607,711 | 8/1952 | Hendricks | 117—122 UX |
| 3,311,489 | 3/1967 | Barbour | 117—76 X |
| 3,508,949 | 4/1970 | Grossman et al. | 117—68.5 |
| 3,268,357 | 8/1966 | Hart et al. | 117—122 |
| 2,721,810 | 10/1955 | Schram | 117—76 X |
| 3,502,497 | 3/1970 | Crocker | 117—76 X |
| 2,940,868 | 6/1960 | Patchell | 117—122 X |
| 3,174,888 | 3/1965 | Morgan | 156—230 |

MURRAY KATZ, Primary Examiner

H. J. GWINNELL, Assistant Examiner

U.S. Cl. X.R.

117—37 R, 122 P; 156—234, 344; 161—148, 406